3,154,562
4a,8a-DILOWERALKOXY-DICYCLOPENTA-p-
DIOXANES
Laurence A. Pursglove, Midland, Mich., assignor to The Dow Chemical Company, Midland, Mich., a corporation of Delaware
No Drawing. Filed Dec. 4, 1961, Ser. No. 156,922
5 Claims. (Cl. 260—340.3)

The present invention is concerned with hetero-cyclic organic chemical compounds and is particularly concerned with substituted dicyclopenta-p-dioxane compounds corresponding to the formula

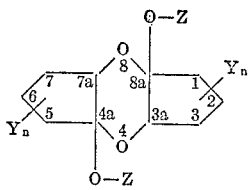

wherein Y and Z are independently lower alkyl and $n$ is selected from 0, 1, and 2. In the instant specification and claims, the expression lower alkyl is used to designate an alkyl group containing from 1 to about 5 carbon atoms, inclusive.

The compounds of the present invention whereof substituents are of relatively lower molecular weight are, in general, oily liquids which can be crystallized in such known techniques as chilling, agitation, and the like; the compounds of relatively higher molecular weight are, in general, crystalline solids which can be liquefied by such known techniques as heating, addition of solvent, and the like. The compounds have distinctive odors and, before purification, tend to appear as lightly colored products of reaction. The compounds are useful as intermediates to be employed, as by the introduction thereupon of various substituents, for the preparation of industrial odorant substances. The compounds are useful directly as insecticides; they are effective as internal medicaments to rid warm-blooded animals of gastro-intestinal parasites, and they are effective as herbicides which are employed with good results in the control of various weeds of such families as the Leguminosae, Gramineae, and Solanaceae. In such action, they are highly selective.

The compounds of the present invention are prepared in a novel reaction which comprises the step of condensing jointly a member of the group consisting of an o-hydroxycyclopentanone and a lower alkyl substituted o-hydroxycyclopentanone, with a lower alkanol. In the synthesis of each mole of the product of the present invention there are consumed two moles of the starting cyclopentanone compounds and two moles of lower alkanol. Either reactant substance may be supplied in an amount in excess of that stoichiometric with the other. Preferably the lower alkanol is supplied in substantial excess, the amount in excess of that entering into the reaction serving as liquid reaction medium. However, other reaction medium may be employed; or, if desired, reaction medium may be omitted altogether, especially when preparing products of lower molecular weight according to the present invention. In such procedure the lower alkanol is preferably supplied in an amount expected to be consumed.

The reaction goes forward readily in the presence of a small, non-critical, catalytic amount of an acidic catalyst such as sulfuric acid, benzenesulfonic acid, p-toluenesulfonic acid, or the anhydride of a lower aliphatic carboxylic acid. In the presence of such catalytic substance, which may be employed in any amount from 0.01 mole percent or less, up to an amount equimolecular with any reactant substance, or more, the reaction goes forward smoothly over a period of time at room temperature. If desired, temperature may be increased moderately above room temperature to carry the reaction more promptly to conclusion.

Upon completion of the condensation reaction of the present invention and prior to the purification of the resulting product, it is preferable to remove or inactivate any acidic catalyst, and this is best done at relatively low temperatures to preclude initiation of undesired alternative reactions. When employing acidic catalyst in only small amounts, the catalyst may be inactivated successfully by neutralizing, preferably employing a substance not itself likely to alter the course of the chosen reaction. A neutralizing agent of choice may be, for example, an anhydrous alkali metal carbonate in an amount slightly in excess of that stoichiometric with the employed amount of acidic catalyst: or when the employed amount of catalyst is unknown, it may be neutralized against a color indicator.

Thereafter, solvent (which may, for example, be an inert solvent or an excess of lower alkanol reactant), if employed, is vaporized and removed and from the resulting product the desired compound is separated in manners which will be evident to skilled chemists in view of the present specification.

Thus, when the desired product is known or expected to be a liquid, or is able to be liquefied by the application of gentle heat, the desired compound may be purified by distillation under gradually increasing temperatures, and if desired, at absolute pressures ranging from atmospheric to far below atmospheric. Conveniently, removal of excess of lower alkanol or other solvent may be carried out as a fractionation, usually of a first or at least an early fraction, in such distillation process. In another method of purification, the desired product may be caused to crystallize in known procedures such as by dilution of solvent with a miscible liquid that is non-solvent, for product; or by concentration of a solvent solution together with agitation, chilling and the like.

Yields of desired product tend to be relatively high in proportion to yield of any alternative substance; there is no true by-product and, except for fractionation of employed excess of lower alkanol, the desired product can usually be identified as the fraction that is most abundant by far, in a distillation procedure.

As representative of the procedural steps whereby the present compounds are conveniently prepared, with due allowance for employment of alternative starting materials of a wide variety, the following examples, without more, will show those skilled in the art how to prepare the present compounds; but it is to be understood that I limit myself only according to the claims.

A synoptic reaction of the present example is as follows:

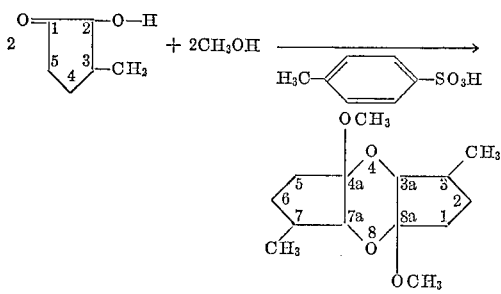

This reaction is synoptic in the sense that transitory unidentified intermediate substances may be formed and be consumed: the starting materials and the product compound, and the molar quantities of each, correspond to the indicated formulas.

EXAMPLE I

*4a,8a-Dimethoxy-3,7-Dimethyldicyclopenta-p-Dioxane*

A solution was prepared consisting essentially of 242 grams (2.12 moles) 2 - hydroxy-3-methylcyclopentanone, and 0.2 gram (about 0.086 mole percent) p-toluenesulfonic acid in 500 milliliters methanol. The resulting solution was allowed to stand, with intermittent agitation, for approximately 250 hours at room temperature, during which time the condensation of the present method occurred and the product of the present nivention was prepared in good yield. At the end of the indicated reaction time, one gram anhydrous potassium carbonate (approximately 0.72 mole percent) was added to the resulting solution and thoroughly stirred to neutralize acidic catalyst. The resulting solution was placed in distillation apparatus and methanol solvent removed promptly at gradually increasing temperatures and gradually declining subatmospheric pressures terminating at 90° C. and 140 millimeters mercury pressure absolute. The resulting product mixture was then further distilled at an absolute pressure of 25 millimeters and at gradually increasing temperatures, to obtain further distillate which was collected as eight successive fractions. Substantially more than one-half the entire contents of the distillation flask was separated as three terminal fractions having almost identical properties, and boiling within a very narrow temperature range of approximately 150° C. The said fractions, that is, the seventh, eighth, and ninth, in order, were sampled, and the samples analyzed. The seventh fraction (having a boiling temperature at 25 millimeters mercury pressure, of 150° C. and refractive index as measured at 25° C. and by the D line of sodium light, of 1.4593) had contents of carbon and hydrogen of 65.7 and 9.32 percent respectively as compared with theoretical values of 65.7 and 9.38.

The next (that is to say the eighth) fraction boiled at the same temperature and had a refractive index as measured under the stated conditions of 1.4592. Similarly, the properties of the last fraction were very similar to those of the two preceding. These three terminal fractions were thereupon combined and subsequently considered to be a single sample and thereafter tested for identity and activity of 4a,8a-dimethoxy-3,7-dimethyl-dicyclopenta-p-dioxane.

By measurement, molecular weight was determined as being 267 plus or minus 13 (as compared with a formula weight of 256.3) infrared spectrum confirmed the assigned structure, and representative reactions yielded expected reaction products.

EXAMPLE II 2-hydroxy-cyclopentanone (9.4 grams, 0.1 mole) is dissolved in 200 milliters ethanol containing approximately 0.1 gram sulfuric acid as catalyst. The resulting solution is allowed to stand, at room temperature and with intermittent agitation, for approximately 175 hours, during which time the cyclopentanone and ethanol condense to form a 3a,7a-diethoxy-dicyclopenta-p-dioxane product. At the end of the indicated reaction time, the remaining solution is passed through a basic ion exchange resin filter bed to neutralize catalytic acid; the neutralized solution is placed in distillation apparatus, ethanol solvent removed and distillation continued to obtain a pale yellow liquid 4a,8a-diethoxy-dicyclopenta-p-dioxane product.

In similar preparation, employing 4-pentyl-2-hydroxycyclopentanone with polyphosphoric acid catalyst and isopropyl alcohol as both solvent and condensation reactant therefor there is obtained a 4a,8a-diisopropoxy-2,6-dipentyl-dicyclopenta-p-dioxane product. The compound is a crystalline solid of distinctive odor. Other compounds of the present invention are similarly prepared: employing 4-butyl-2-hydroxycyclopentanone and methanol as solvent and reactant there is obtained the 2,6 - dibutyl-4a,8a-dimethoxydicyclopenta-p-dioxane: employing 4-methyl-2-hydroxycyclopentanone, toluene as solvent, and n-propanol in an amount equimolecular with the employed amount of cyclopentanone compound, at a reaction temperature of 50° C., there is obtained a 2,6-dimethyl-4a,8a-dipropoxy-dicyclopenta - p - dioxane product:

Employing 4 - isopropyl - 2 - hydroxycyclopentanone in mixed dichlorobenzenes as solvent and with pentan-3-ol as alkanol reactant at a reaction temperature of about 75° C., there is obtained a 2,6-diisopropyl-4a,8a-di-α-ethylpropoxydicyclopenta-p-dioxane product.

Other similar inert liquid reaction media, alkanols, and substituted 2-hydroxycylopentanone products are similarly employed, with preparation of products which, in view of the present specification, are obvious.

EXAMPLE III 31.4 grams (0.2 mole) 3-t-butyl-2-hydroxycyclopentanone and 18.02 grams (0.2 mole) n-butanol are combined in 500 milliliters excess n-butanol. To the resulting mixture is added approximately 0.1 gram polyphosphoric acid as catalyst. The resulting reaction mixture is placed in a flask provided with heating means and stirring means and is heated at approximately 50° C., for approximately 168 hours to carry to completion a condensation reaction according to the present invention. At the end of this time, aqueous sodium bicarbonate is added to neutralize the polyphosphoric acid catalyst and excess alkanol solvent and water are removed by vaporization: the product is thereafter water-washed and dried. As a result of these operations there is obtained approximately 1/10 mole (49 grams) 3,7-di-t-butyl-4a,8a-di-n-butoxydicyclopenta-p-dioxane.

In similar preparation, by condensation of 4-methyl-5-n-pentyl-2-hydroxycyclopentanone in isopropanol there is obtained a 2,6-dimethyl-1,5-di-n-pentyl-4a,8a-isopropoxy-dicyclopenta-p-dioxane product.

Various of the hydroxycyclopentanone compounds to be used as starting materials in the present invention are articles of commerce. Those which are not are readily prepared by the employment of suitable starting materials in known procedures. See, for example, the method of Semmler wherein a substituted pentanone is prepared by cyclization of a substituted adipic acid (Berichte der deutchen chemischen Gellschaft 25 (3) page 3517 and following.) This work was verified and expanded by Wallach (Berichte 29 (2) page 1601.)

The procedural steps of the method of Semmler and Wallach are expanded, and present-day laboratory procedures are fully set forth in "Organic Syntheses" (Wiley, New York) 1925 vol. 5, page 37.

Also, 2-hydroxypentanone is readily obtained, as footnotes in the above references indicate, by the pyrolysis of wood and the fractional distillation of the resulting "wood oil."

I claim:
1. A compound corresponding to the formula

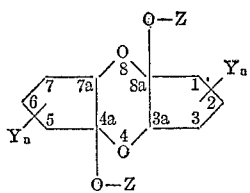

wherein each of Y and Z is independently alkyl of 1 to 5 carbon atoms; $n$ is an integer from 0 to 2.

2. 4a,8a-dimethoxy-3,7-dimethyldicyclopenta-p-dioxane.
3. 4a,8a-diethoxy-dicyclopenta-p-dioxane.
4. 2,6 - dibutyl - 4a,8a - dimethoxy - dicyclopenta - p-dioxane.
5. A method of synthesizing a dicyclopenta-p-dioxane compound which comprises condensing jointly a member of the group consisting of o-hydroxycyclopentanone and a lower alkyl o-hydroxycyclopentanone with a lower alkyl alcohol, wherein loweralkyl is alkyl of 1 to 5, carbon atoms.

No references cited.